June 7, 1938. M. TIBBETTS 2,119,656
MOTOR VEHICLE
Filed April 20 1934 2 Sheets-Sheet 1
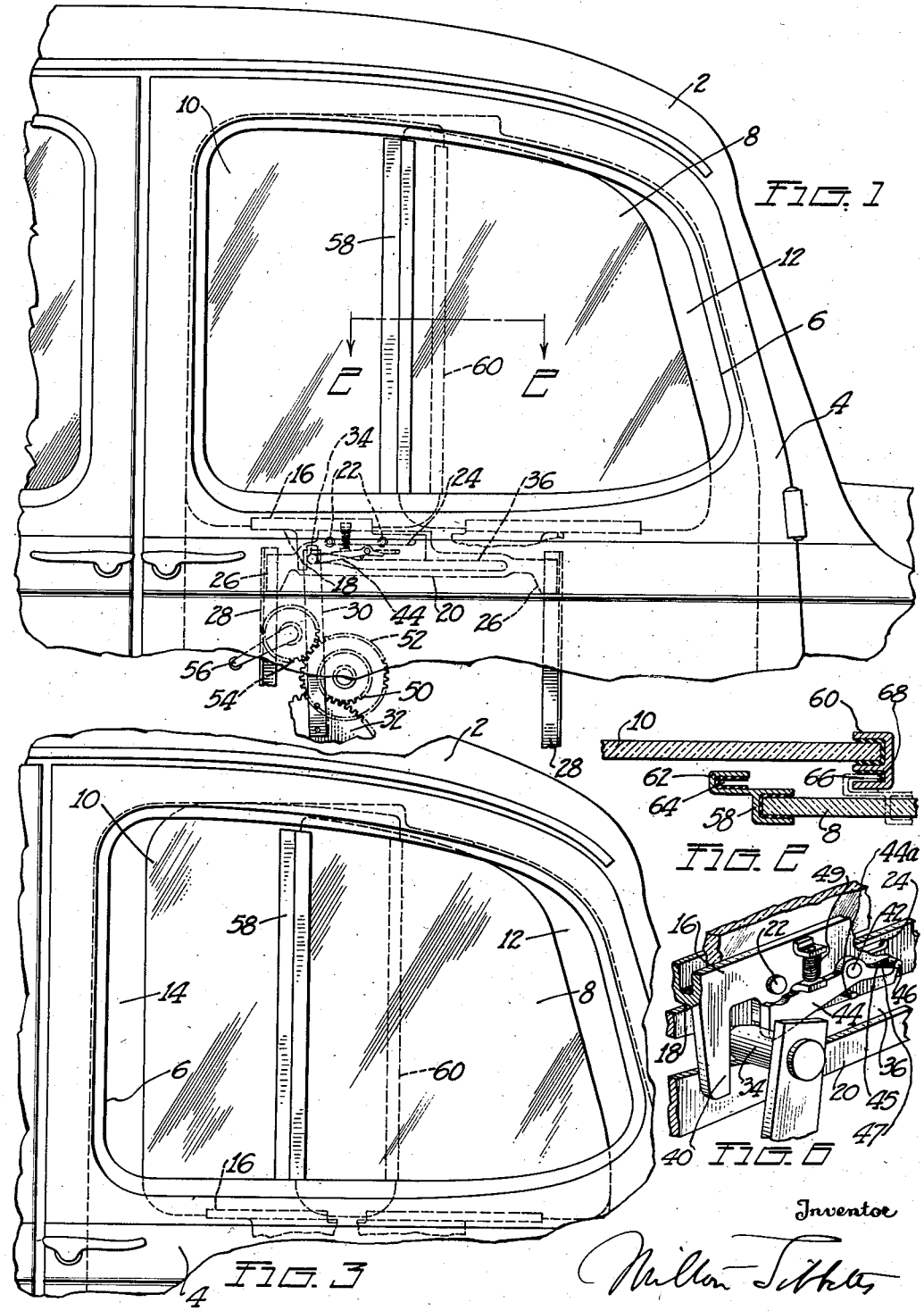

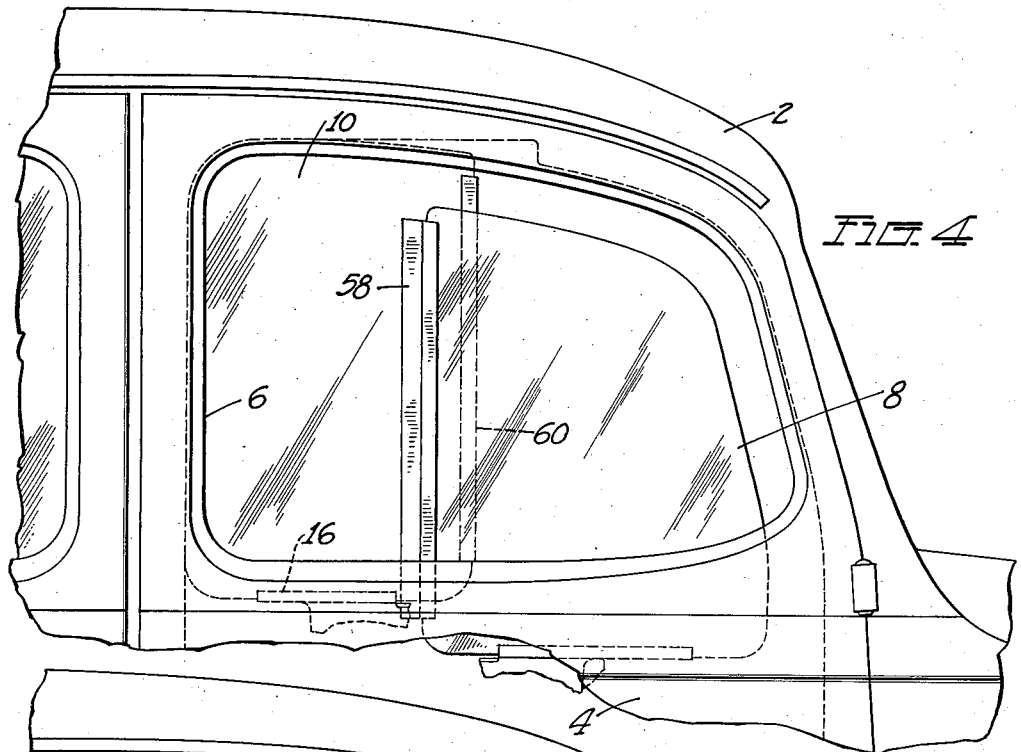
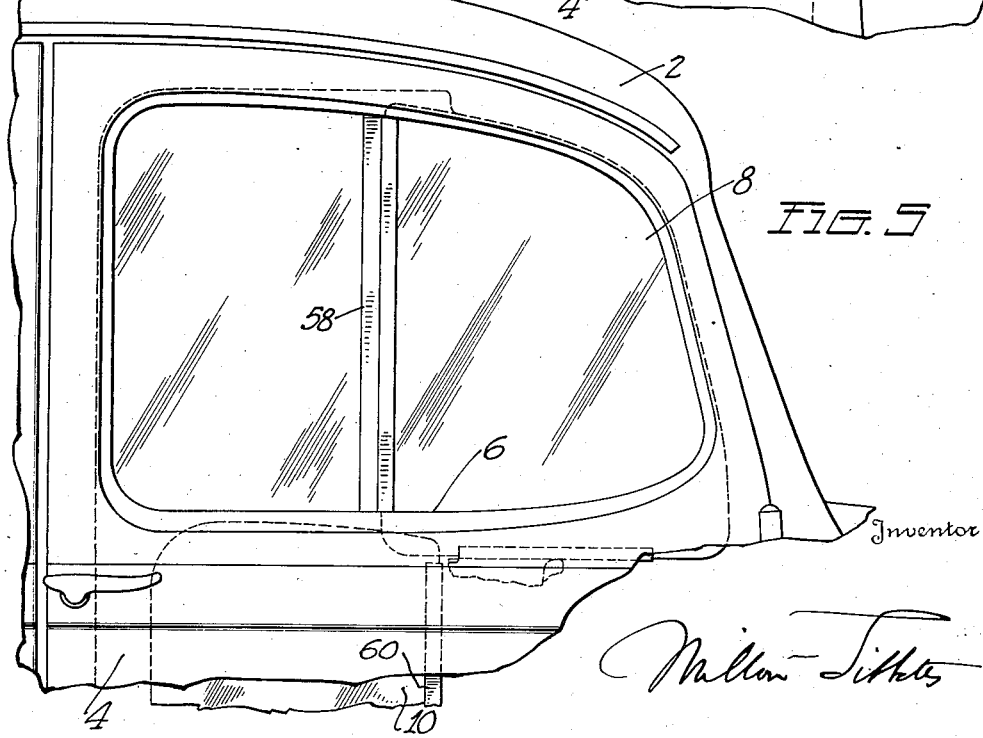

Patented June 7, 1938

2,119,656

UNITED STATES PATENT OFFICE 2,119,656

MOTOR VEHICLE

Milton Tibbetts, Detroit, Mich., assignor to Packard Motor Car Company, Detroit, Mich., a corporation of Michigan Application April 20, 1934, Serial No. 721,415

8 Claims. (Cl. 296—44)

This invention relates to motor vehicles and more particularly to window constructions for the bodies of motor vehicles.

One object of the present invention is to improve the construction and mode of operation of windows for motor vehicles and to provide a window construction in which the windows may be adjusted in a novel and improved manner.

Another object of the invention is to produce a window construction for motor vehicles in which the windows may be positioned to provide certain new arrangements of window openings.

Another object of the invention is to provide a window construction for motor vehicles in which the windows may be adjusted to secure certain improved results in the ventilation of a motor vehicle body.

With the above and other objects in view, the invention consists in a window construction embodying the novel and improved features hereinafter described and particularly pointed out in the claims, the advantages of which will be readily understood by those skilled in the art.

The invention will be clearly understood from the accompanying drawings illustrating a window construction embodying the invention in its preferred form and the following detailed description of the constructions therein shown.

In the drawings, Fig. 1 is a view in side elevation illustrating the forward portion of the body of a motor vehicle having a window construction embodying the present invention;

Fig. 2 is a sectional view taken substantially on line 2—2 of Fig. 1;

Figs. 3, 4 and 5 are views similar to Fig. 1 illustrating respectively certain of the parts in different positions and Fig. 6 is a detail perspective view illustrating certain parts of the window operating mechanism.

The invention is illustrated in this application as applied to the body of a motor vehicle indicated at 2. The invention is shown as applied to one of the doors 4 of the vehicle having a window casing 6 in the upper portion thereof.

In the form of the invention illustrated in this application, the door 4 is provided with two transparent window sections preferably made of glass and indicated respectively at 8 and 10. The section 8 is movable horizontally from the closed position shown in Fig. 5 to the partially open position shown in Fig. 1 to leave a relatively long narrow opening 12 between the forward portion of said section and the window frame. The section 8 is also movable vertically from the position shown in Fig. 1 to fully open position entirely within the lower portion of the door. In the preferred construction, the section 8 is so supported and operated that in moving the same from closed to fully open position, the section is first moved horizontally into the position shown in Fig. 1 and is then moved vertically downward to fully open position.

The section 10 is movable horizontally from closed position shown in Fig. 5 to the partially open position shown in Fig. 3 to leave a relatively long narrow opening 14 between the rear edge of said section and the window frame. The section 10 is also movable vertically from the position shown in Fig. 3 to fully open position entirely within the lower portion of the door as shown in Fig. 5. The section 10 and the mechanism for supporting and operating the same are preferably so constructed and arranged that, in moving said section from closed to fully open position, the section is first moved horizontally into the position shown in Fig. 3 and is then moved vertically downward to fully open position.

Any suitable mechanism may be employed for producing the horizontal and vertical movements of the two window sections. Fig. 1 shows one mechanism which may be employed for producing these movements. In the construction shown in this figure, the lower edge of the section 10 is secured within a groove in a supporting member 16 mounted for horizontal and vertical movements. The member 16 is provided with a shoulder 18 which slidably engages the upper edge of a carrier 20 and said member is connected with the carrier by means of pins 22 engaging in a slot 24 in the carrier. The carrier 20 is provided at its opposite ends with projecting shoes 26 which engage vertical guides 28 mounted on the door.

The vertical movements of the window section 10 are produced by moving the carrier 20 vertically and the horizontal movements of said section are produced by moving horizontally the supporting member 16. The mechanism for producing these movements of the window section comprises an arm 30 secured to a rotary gear 32 and carrying at its outer end a pin 34 which engages in a slot 36 in the carrier 20. The major portion of the slot 36 is preferably substantially horizontal so that the movements of the pin 34 therethrough will produce vertical movements of the carrier 20. The left hand portion of the slot 36 however conforms to an arc struck from the center of the gear 32. The movement of the pin 34 through the latter portion of the slot 36 therefore will produce no vertical movement of the carrier 20.

The horizontal movements of the member 16 are produced by the pin 34 during the movements of said pin through the arcuate portion of the slot 36. To this end the member 16 is formed with a projection 40 extending downwardly into the path of the pin. A latch 44 is pivoted at 42 to the member 16 and its left hand end, Fig. 1, is spaced from the projection 40 to receive the pin 34 between them, as shown in Figs. 1 and 6. The downward movement of the latch 44 is limited by means of stop pin 44a mounted on the member 16. The latch is lifted to disengage the same from the pin 34 substantially at a predetermined point in the movement of the member 16 to the right, Fig. 1, by the engagement of a cam face 45 on the latch with a pin 46 mounted on the carrier 29 and passing through a slot 47 in the member 16. The latch is held in position in engagement with the pin 44a by means of a coiled spring 49.

The gear 32 is rotated manually to move the window section 10 laterally and to raise and lower the same preferably by means of a reduction gear train comprising gears 50, 52 and 54 rotatably mounted on the door frame. To the shaft of the gear 54 is secured a crank arm 56 for rotating manually said gear.

The mechanism above described for operating the window section 10 has the following mode of operation. Starting with the parts substantially in the positions shown in Fig. 1 in which the window section 10 is completely closed, the pin 34 then engaging between the projection 40 and the latch 44, the crank 56 is rotated in a clockwise direction to open the window section, thereby rotating the gear 32 in the same direction. As the arm 30 swings to the right from the position shown in Fig. 1, the movement of the pin 34, through the engagement of said pin with the end of the latch 44, moves the member 16 to the right therewith, thereby sliding the window section horizontally to the position shown in Fig. 3 to produce a ventilating opening between the left hand edge of the window section and the window frame. Substantially as the pin 34 reaches the horizontal portion of the slot 36 the latch is lifted by the engagement of the cam face 45 with pin 46 sufficiently to free the end of the same from operative engagement with the pin 34 allowing the pin to swing past the end of the latch thereby causing the termination of the horizontal movement of the member 16. During the continued swinging movement of the arm 30, the engagement of the pin 34 in the horizontal portion of the slot 36 will lower the window section.

During the turning movement of the gear 32 by means of the crank 56 in the reverse direction, the swinging movement of the arm 30 will raise the window section during the engagement of the pin 34 in the horizontal portion of the slot 36, the pin reaching the arcuate left hand portion of the slot substantially as the window section reaches its uppermost position. Just before the pin 34 reaches the arcuate portion of the slot, said pin engages the latch 44 and lifts the latch and passes beyond the same into engagement with the projection 40, the latch dropping down behind the pin into substantially the position shown in Figs. 1 and 6 as the pin passes the end of the latch. During the continued swinging movement of the arm 30, the member 16 is moved to the left to move the window section horizontally into closed position by the engagement of the pin with the projection 40. This movement of the pin, however, produces no vertical movement of the window section since the pin is moving through the arcuate portion of the slot 36.

Mechanism similar to the mechanism for moving the window section 10 is provided for moving the window section 8. However, the mechanism for moving the window section 8 from closed to fully open position is arranged to move said section first horizontally to the left substantially into the position shown in Fig. 1 and then downwardly. The principal parts of a mechanism such as that shown for operating the window section 10 would, therefore, have to be reversed in positions in order to impart the required movements to the section 8. It is not considered necessary to show the mechanism for operating the section 8 in this application.

In order to provide a tight joint between the window sections 8 and 10 when both sections are in closed positions, the closure strips 58 and 60 are mounted respectively on the adjacent edges of said sections. The strip 58 is provided with a groove to receive the edge of the window section 8. Said strip is also formed with a flange 62 and a relatively narrow groove 64 arranged to interfit with a flange 66 and a similar groove 68 on the strip 60 when the sections are in closed positions. The strip 60 is also provided with a groove to receive the edge of the window section 10. Fig. 2 shows in full lines the positions of the strips 58 and 60 when the window sections 8 and 10 are in the positions shown in Fig. 1. When either of the sections 8 and 10 is moved horizontally into closed position, while the other section is in closed position, the strips 58 and 60 will be moved into interfitting relation. The parts are preferably constructed and arranged so that the horizontal closing movement of a section produced by the actuation of the operating mechanism will force the strips 58 and 60 tightly together to form a tight joint between the sections.

With the above construction a wide range in the arrangement of the window openings may be secured. As above described the window section 8 may be adjusted horizontally to provide a relatively narrow opening 12 in the front thereof, the section then being in fully raised position. The said section may also be adjusted vertically in any desired position between the fully raised position shown in Fig. 1 and fully lowered position. Thus the section may be adjusted to provide an opening extending along the front of and above said section, the width of the opening above the section depending upon the vertical adjustment of the section. In a similar manner the section 10 may be adjusted horizontally to provide an opening 14 at the rear thereof or to provide an opening extending at the rear of and above the section, the width of the opening above the section depending upon the vertical adjustment of the section. An almost unlimited number of variations in the window openings may be produced by combinations of various adjustments of the two sections.

By adjusting the section 10 in fully lowered position on the side of the motor vehicle upon which the driver is seated, with the corresponding section 8 in closed position, an opening is provided through which the arm of the driver may be projected for the purpose of signaling and the closed front section 8 will protect the driver from drafts.

It is to be understood that the invention is not limited to the particular construction and arrangement of parts of the illustrated embodiment of the invention, but that the construction shown and described is merely illustrative of the invention and that the invention may be embodied in other forms within the scope of the claims.

What I claim is:

1. A window construction for motor vehicles comprising forward and rear window sections each mounted for horizontal movement, means for adjusting and holding the forward section in position with an opening between the forward edge of the glass and the window frame, and means for adjusting and holding the rear section in position with an opening between the rear edge of the glass and the window frame, said holding means being constructed to hold said sections from horizontal movement in either direction after adjustment thereof.

2. A window construction for motor vehicles comprising a transparent panel movable vertically and horizontally between open and closed positions and means for supporting and moving said panel including a vertically movable carrier having a slot therein, means for guiding the carrier, a support mounted for horizontal movement on the carrier, an operating lever, a device carried by said lever engaging in the slot in the carrier to raise and lower the carrier, the support having an abutment engaged by said device to move the support in one direction horizontally, a latch carried by the support and engaged by said device to move the support horizontally in the opposite direction and means to throw the latch into and out of operative position at predetermined points in the movement of the carrier.

3. A window construction for motor vehicles comprising two window sections, and mechanisms associated with such sections and operable to move the same individually in directions vertically or longitudinally of said vehicle.

4. A window construction for motor vehicle bodies comprising two window sections, and operating mechanisms associated with said window sections, actuation of such mechanisms moving the sections independently either vertically or in opposite directions longitudinally of the body.

5. A window construction for motor vehicle bodies comprising two window sections arranged to close an opening in the body wall, a vertically adjustable carrier for each section, mountings for the window sections carried by said carrier and movable longitudinally of the body, mechanisms operable from the interior of the body for independently raising and lowering said carriers, and mechanisms operated by said raising and lowering mechanisms to shift said mountings on said carriers in a direction longitudinally of the body and thereby open the front and rear ends of the window opening in the body.

6. A window construction for motor vehicles comprising a transparent panel, a vertically movable carrier, a support for the panel mounted on the carrier for movement thereon longitudinally of the vehicle, actuator means operable to shift such carrier vertically, abutment means engaged by said actuator means for moving the support longitudinally of the vehicle, and means on said carrier for shifting a portion of the abutment means into and out of operative engagement with said actuator means.

7. A window construction for motor vehicles comprising a transparent panel, a vertically movable carrier, a support for the panel mounted on the carrier for movement thereon longitudinally of the vehicle, actuator means operable to shift said carrier vertically, abutment means engageable by said actuator means for moving the support longitudinally of the vehicle, a portion of said abutment means being movably mounted on said support, and means on said carrier for shifting the movable portion of the abutment means into and out of operative engagement with said actuator means.

8. A window construction for motor vehicles comprising a transparent panel, a vertically movable carrier, a support for the panel mounted on the carrier for movement thereon longitudinally of the vehicle, actuator means operable to shift said carrier vertically, abutment means engageable by said actuator means for moving the support longitudinally of the vehicle, a portion of said abutment means being pivotally mounted on said support, and means on said carrier for shifting the pivoted abutment means into and out of operative engagement with said actuator means.

MILTON TIBBETTS.